United States Patent
Studebaker et al.

(10) Patent No.: US 12,539,954 B2
(45) Date of Patent: Feb. 3, 2026

(54) SPLIT COOLING SYSTEM FOR MARINE JET ENGINE

(71) Applicants: Chad Studebaker, Burlington, WA (US); Olin Green, Bow, WA (US)

(72) Inventors: Chad Studebaker, Burlington, WA (US); Olin Green, Bow, WA (US)

(*) Notice: Subject to any disclaimer, the term of this patent is extended or adjusted under 35 U.S.C. 154(b) by 452 days.

(21) Appl. No.: 18/317,687

(22) Filed: May 15, 2023

(65) Prior Publication Data

US 2023/0365243 A1 Nov. 16, 2023

Related U.S. Application Data

(60) Provisional application No. 63/341,806, filed on May 13, 2022.

(51) Int. Cl.
  B63H 21/38 (2006.01)
  B63H 11/00 (2006.01)
  B63H 21/14 (2006.01)

(52) U.S. Cl.
  CPC ........... B63H 21/383 (2013.01); B63H 11/00 (2013.01); B63H 21/14 (2013.01)

(58) Field of Classification Search
  CPC ...... B63H 21/00; B63H 21/38; B63H 21/383; B63H 21/14; B63H 11/00
  USPC ........................................... 440/38, 39, 88 C
  See application file for complete search history.

(56) References Cited

U.S. PATENT DOCUMENTS

| | | | |
|---|---|---|---|
| 6,036,556 A * | 3/2000 | Baker | B63H 11/01 440/88 M |
| 6,821,171 B1 | 11/2004 | Wynveen et al. | |
| 6,881,109 B2 * | 4/2005 | Matsuda | B63H 11/08 440/88 M |
| 7,247,068 B2 * | 7/2007 | Iwakami | F01P 5/10 440/38 |
| 7,287,493 B2 | 10/2007 | Buck | |
| 10,092,863 B1 | 10/2018 | George et al. | |
| 2003/0153219 A1 | 8/2003 | Menard et al. | |
| 2009/0130928 A1 | 5/2009 | Taylor et al. | |

FOREIGN PATENT DOCUMENTS

GB 2508196 A 8/2015

* cited by examiner

*Primary Examiner* — Daniel V Venne

(57) ABSTRACT

A cooling system for marine jet engines includes a marine jet engine assembly, a pressurized raw water inlet, a centrifugal filter, a strainer, and a hull-mounted heat exchanger. The marine jet engine assembly is configured with an engine, a drive shaft, a stator, a manifold heat exchanger, an exhaust, a water pump, and a coolant outlet so that the vessel can be functional. The pressurized raw water intake is in fluid communication with the stator. The centrifugal filter is in fluid communication with the pressurized raw water intake to supply a direct flow of raw water from the stator. The raw water is then cleaned through the strainer, discharged into a water inlet of the manifold heat exchanger, and discharged from a water outlet of the manifold heat exchanger before exiting into the exhaust. The hull-mounted heat exchanger is in fluid communication with the coolant outlet and the water pump.

18 Claims, 4 Drawing Sheets

SPLIT COOLING SYSTEM FOR MARINE JET ENGINE

FIELD OF THE INVENTION

The present invention relates generally to a cooling system of an engine. More specifically, the present invention is a split system cooling system for marine jet engines that utilizes the benefits of both the closed loop cooling and the raw water cooling to maximize engine performance in marine jet engines.

BACKGROUND OF THE INVENTION

Marine engines are generally cooled by the raw water cooling system and/or the closed-loop cooling system. The Raw water cooling systems draw water from outside the boat (seawater or lake water) so that the water can be pumped from the source to the engine block, and then the engine circulation pump forces the raw water through the engine block and the water is expelled through the exhaust. Raw water cooling systems are relatively simple and the standard cooling system on most Marine Engines. The biggest drawback of the raw water cooling system is the constant failure of the raw water pump that leads to the overheating of the engine and destructive corrosion that can take place within the engine and the exhaust due to usage of the salt water. Even though there are many different types of closed-loop cooling systems, the most common type utilizes a Heat Exchanger which functions similarly to the radiator. Coolant (antifreeze) is circulated through the heat exchanger where it is cooled by raw water that passes through the heat exchanger as the raw water is pumped into the system by the raw water pump. The engine coolant is then circulated back into the engine and the raw water is expelled out of the boat through the exhaust. Due to the constant failure of the raw water pump, the closed-loop cooling system also fails to effectively cool the engine.

It is therefore an objective of the present invention to provide a split system cooling system for marine jet engines that eliminates the problematic raw water pump. The present invention utilizes a direct flow of raw water from the stator of the marine jet engine so that the direct flow of raw water can be cleaned and utilized within the heat exchanger to cool down the engine. Furthermore, the present invention utilizes a separate heat exchanger that is mounted at the bottom of the hull to cool down the engine, when the boat transmission is in the neutral and the direct flow of raw water is not available from the stator. Resultantly, the present invention is able to improve the cooling process of the engine thus maximizing engine performance.

DETAIL DESCRIPTIONS OF THE INVENTION

All illustrations of the drawings are for the purpose of describing selected versions of the present invention and are not intended to limit the scope of the present invention.

Figure 1:
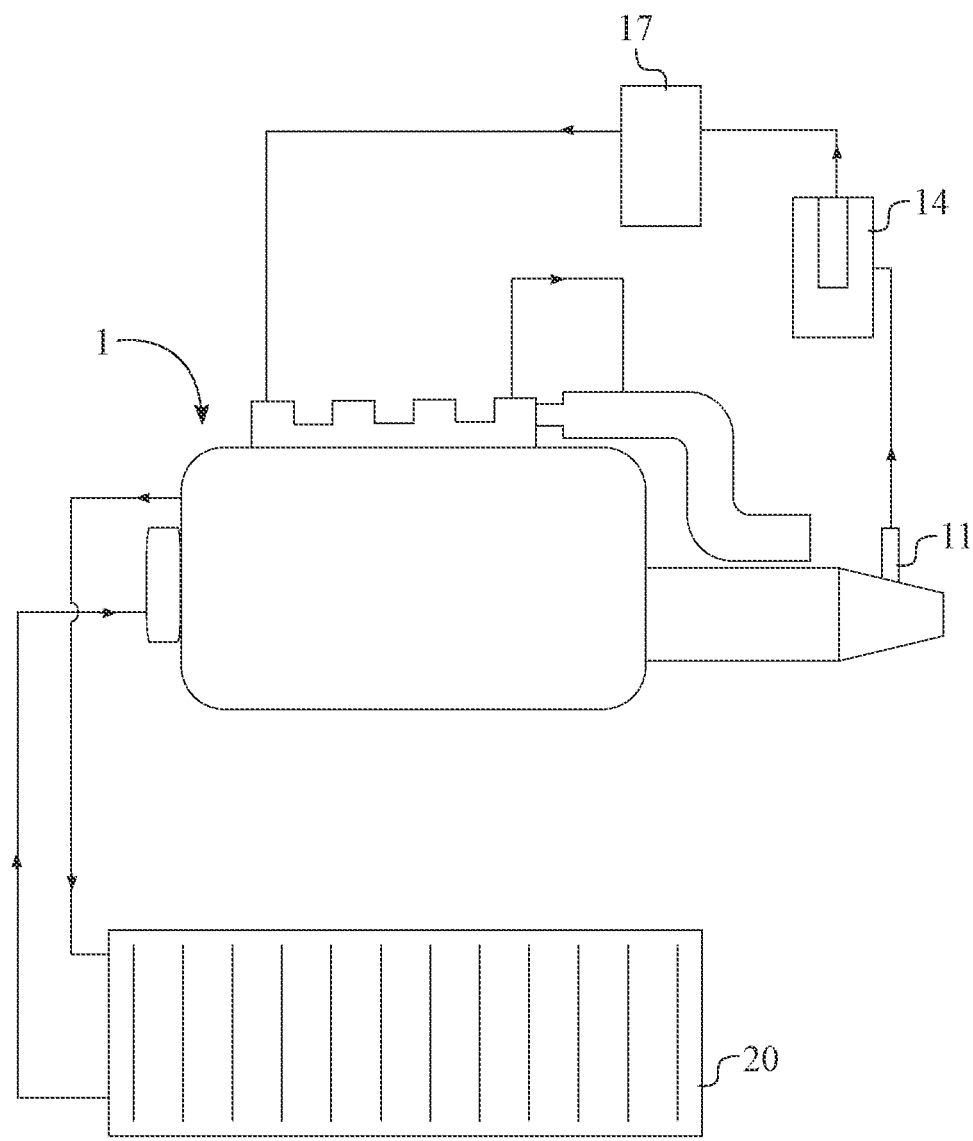
FIG. 1 is an illustration showing all of the fluid communications of the present invention.
Figure 2:
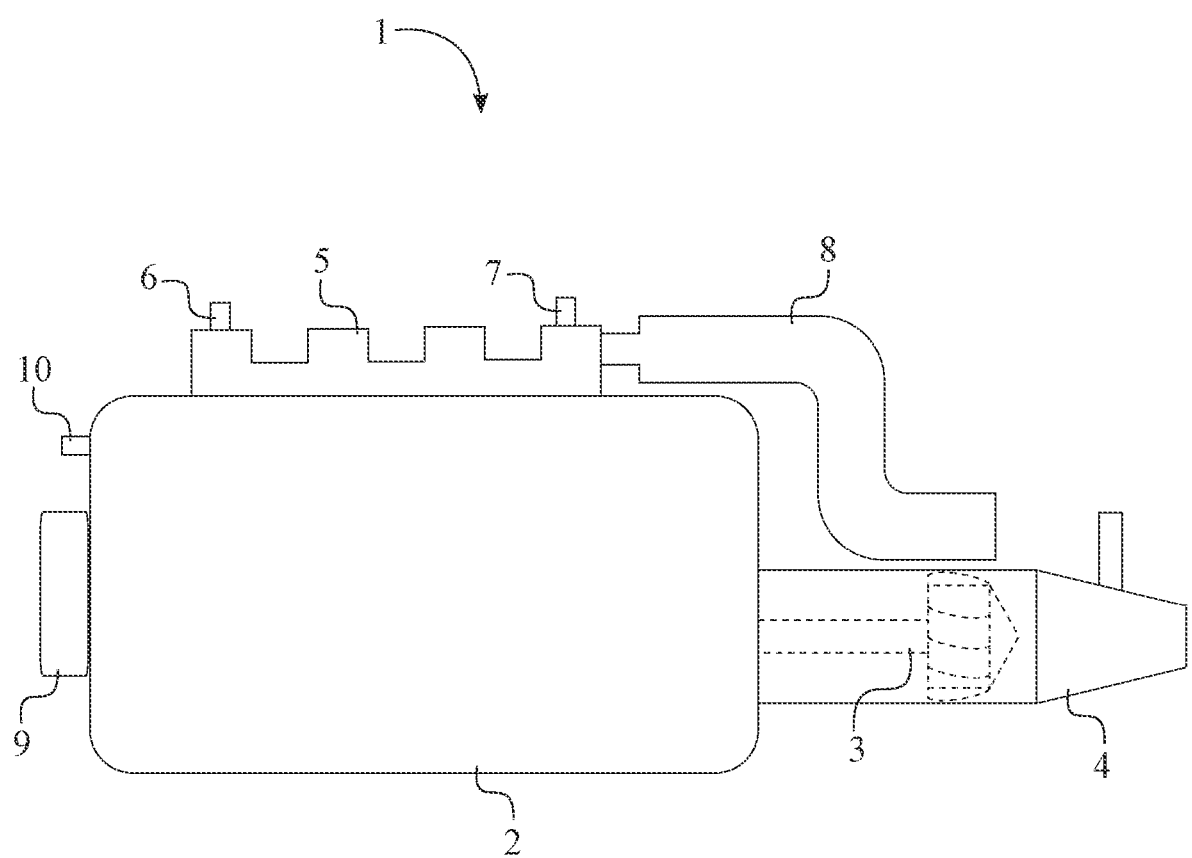
FIG. 2 is an illustration showing the marine jet engine assembly of the present invention.

The present invention is a cooling system for marine jet engines and can be utilized within boats that operate in shallow or brackish water environments. Existing cooling apparatus for marine jet engines uses a raw water pump so that a flow of raw water can be pumped into the existing cooling apparatus to cooldown the marine jet engines. However, due to impurities of the raw water, these raw water pumps tend to fail regularly thus damaging the marine jet engines. As a solution, the present invention is able to provide a system that cools the marine jet engines without the usage of the raw water pump to maximize engine/vessel performance. As shown in FIG. 1, the present invention comprises a marine jet engine assembly 1, a pressurized raw water intake 11, a centrifugal filter 14, a strainer 17, and a hull-mounted heat exchanger 20.

In reference to a general configuration of the present invention, as shown in FIG. 1-4, the marine jet engine assembly 1 that enables the operation of the vessel comprises an engine 2, a drive shaft 3, a stator 4, a manifold heat exchanger 5, an exhaust 8, a water pump 9, and a coolant outlet 10. The pressurized raw water intake 11 is in fluid communication with the stator 4 so that a direct flow of pressurized raw water can be channeled from the stator 4. The centrifugal filter 14 is in fluid communication with the pressurized raw water intake 11 so that the direct flow of pressurized raw water can be discharged into the centrifugal filter 14. The centrifugal filter 14 functions as the first purification unit and removes heavier particles from the raw water that is collected within. The strainer 17 is in fluid communication with the centrifugal filter 14 so that the raw water from the centrifugal filter 14 can be discharged into the strainer 17. The strainer 17 functions as the second purification unit and removes lighter particles from the raw water that is collected within. A water inlet 6 of the manifold heat exchanger 5 is in fluid communication with the strainer 17 so that a flow of purified raw water from the strainer 17 can be discharged into the manifold heat exchanger 5. The flow of purified raw water then circulates through the manifold heat exchanger 5 and removes heat energy from the engine 2. A water outlet 7 of the manifold heat exchanger 5 is in fluid communication with the exhaust 8 thus allowing the flow of purified raw water to exist with the exhaust gas. Since the direct flow of pressurized raw water is only available when the boat transmission is in the forward position and the reverse position, the present invention utilizes the hull-mounted heat exchanger 20 to remove heat energy from the engine 2 when the boat transmission is in the neutral position. An inlet port 15 of the hull-mounted heat exchanger 20 is in fluid communication with the coolant outlet 10 so that a flow of hot coolant from the engine 2 can be discharged into the hull-mounted heat exchanger 20. An outlet port 16 of the hull-mounted heat exchanger 20 is in fluid communication with the water pump 9 thus allowing a flow of cold coolant to return back into the engine 2 via the water pump 9. As a result, the hull-mounted heat exchanger 20 is able to effectively remove heat energy from the engine 2 when the boat transmission is in the neutral position.

The marine jet engine 2 functions as the drivetrain of the vessel so that the vessel can be operational. In reference to FIG. 2, the engine 2 is an internal combustion engine that converts chemical energy into a mechanical energy. The drive shaft 3 is operatively coupled to the engine 2 so that the mechanical energy of the engine 2 can be transferred to a kinetic energy of the drive shaft 3. The drive shaft 3 is enclosed by the stator 4 so that water underneath the vessel can be propelled through the stator 4 to move the vessel. The manifold heat exchanger 5 is operatively coupled to the engine 2, wherein the manifold heat exchanger 5 dissipates generated heat energy of the engine 2 to optimize performance and the efficiency. The exhaust 8 is operatively coupled to the engine 2 so that the exhaust 8 is able to remove generated waste gases from the engine 2. The water pump 9 is operatively coupled to the engine 2 so that the flow of cold coolant can be circulated into the engine 2 and the flow of hot coolant can be circulated from the engine 2. The coolant outlet 10 is operatively coupled to the engine 2, wherein the coolant outlet 10 discharges the flow of hot coolant from the engine 2. In other words, the flow of cold coolant and the flow of hot coolant are two different fluid streams with a closed-loop cooling system of the vessel as both fluid streams are circulated by the operation of the water pump 9.

Figure 3:
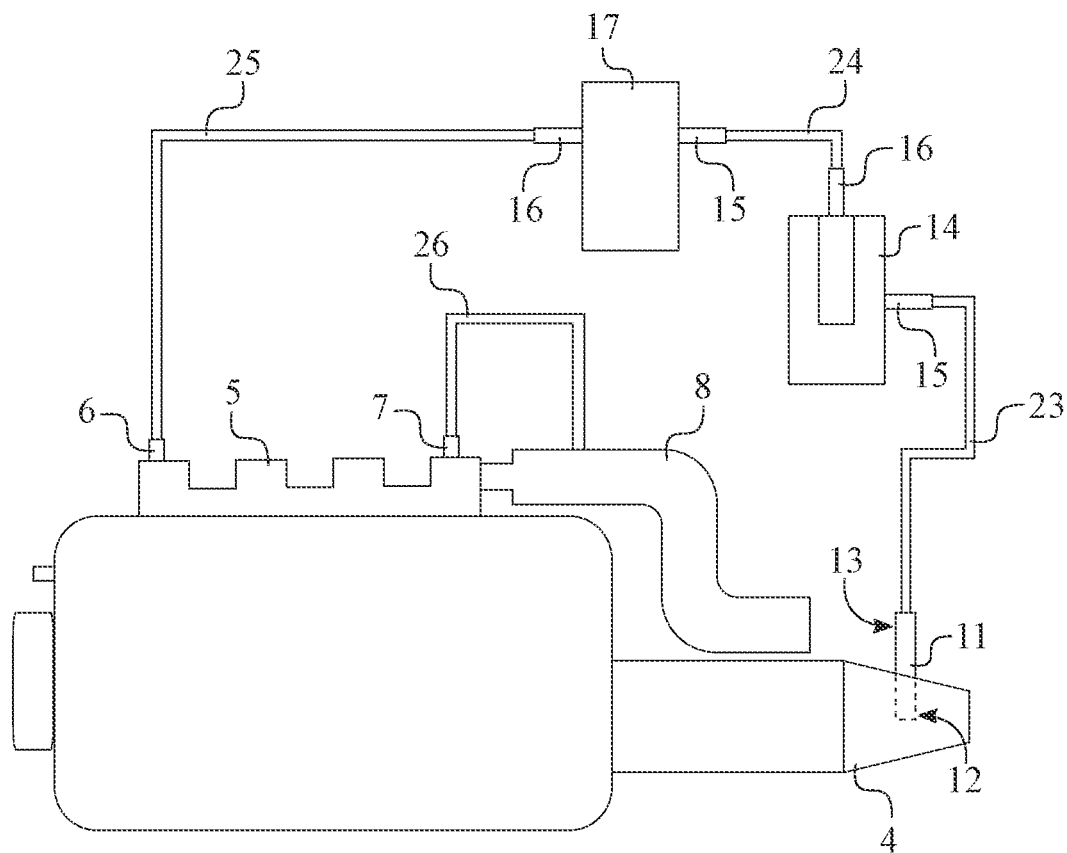
FIG. 3 is an illustration showing the raw water cooling of the present invention.

In reference to FIG. 3, the present invention further comprises a first connector hose 23 to complete the in fluid communication between the centrifugal filter 14 and the pressurized raw water intake 11. More specifically, the pressurized raw water intake 11 is mounted to the stator 4, and the centrifugal filter 14 is mounted offset to the pressurized raw water intake 11. A supply end 12 of the pressurized raw water intake 11 is positioned within the stator 4 to capture the direct flow of pressurized raw water. A discharge end 13 of the pressurized raw water intake 11 is positioned external to the stator 4 so that the first connector hose 23 can be mounted in between the discharge end 13 and an inlet port 15 of the centrifugal filter 14. In order for the pressurized raw water intake 11 to be operational, the jet pressure at the stator 4 should range from 5 Pounds per square inch (psi) at idle to 27 psi at wide open throttle and the jet bleed pressure must overcome exhaust 8 back pressure. The centrifugal filter 14 removes heavier particles such as sand, sediment, and organic matter from the raw water to prevent clogging that occur with the manifold heat exchanger 5.

In reference to FIG. 3, the present invention further comprises a second connector hose 24 to complete the in fluid communication between the strainer 17 and the centrifugal filter 14. More specifically, the strainer 17 is mounted offset to the centrifugal filter 14 so that the second connector hose 24 can be mounted in between an outlet port 16 of the centrifugal filter 14 and an inlet port 15 of the strainer 17. The strainer 17 removes light particles such as moss, leaves, and other particles that are not removed by the centrifugal filter 14 to prevent clogging that occur with the manifold heat exchanger 5.

In reference to FIG. 3, the present invention further comprises a third connector hose 25 to complete the in fluid communication between the strainer 17 and the manifold heat exchanger 5. More specifically, the third connector hose 25 is mounted in between an outlet port 16 of the strainer 17 and the water inlet 6 of the manifold heat exchanger 5. As a result, the flow of purified raw water can enter into the manifold heat exchanger 5 to remove heat energy from the engine 2.

In reference to FIG. 3, the present invention further comprises a fourth connector hose 26 to complete the in fluid communication between the manifold heat exchanger 5 and the exhaust 8. More specifically, the fourth connector hose 26 is mounted in between the water outlet 7 of the manifold heat exchanger 5 and the exhaust 8. As a result, the flow of purified raw water that travels through the jacketed water cooling system of the engine 2 can be removed from the engine 2 and discharged into the exhaust 8. Then, the discharged raw water is able to mix with the generated waste gases of the engine 2 and exits into the atmosphere via the exhaust 8.

When the jet pressure at the stator 4 ranges less than 5 psi, the pressurized raw water intake 11 is not operation and as the direct flow of pressurized raw water is not able available. In other words, when the boat transmission is in the neutral position, the present invention utilizes the hull-mounted heat exchanger 20 to remove heat energy from the engine 2. The hull-mounted heat exchanger 20 is mounted offset to the engine 2 and through the hull of the vessel.

Preferably, the hull-mounted heat exchanger 20 is mounted inside of the hull of a metal boat and adds zero drag to the bottom of the vessel. Furthermore, the hull-mounted heat exchanger 20 provides is able to remove heat energy from the engine 2 when the raw water cooling system is restricted or plugged. The hull-mounted heat exchanger 20 needs to be appropriately sized to accommodate the size of the engine 2. For example, the hull-mounted heat exchanger 20 for 600-horsepower engine 2 may approximately size to 1,100 square inches and raised 2 inches off the hull for maximum efficiency. The hull-mounted heat exchanger 20 comprises a series of channels which direct the flow and is configured as a maze formation that can distribute in either a side to side or front to back. The maze formation agitates the coolant giving maximum exposure of coolant to the hull for heat transfer. The passages in the maze formation should not be any smaller in area or volume than that of the coolant crossover tubes in the engine 2 cooling system. Preferably, the coolant crossover tubes are two inches in diameter to eliminate restriction issues. Furthermore, the coolant should flow in the opposite direction of the water flowing direction in which the boat travels to obtain maximum heat transfer.

Figure 4:
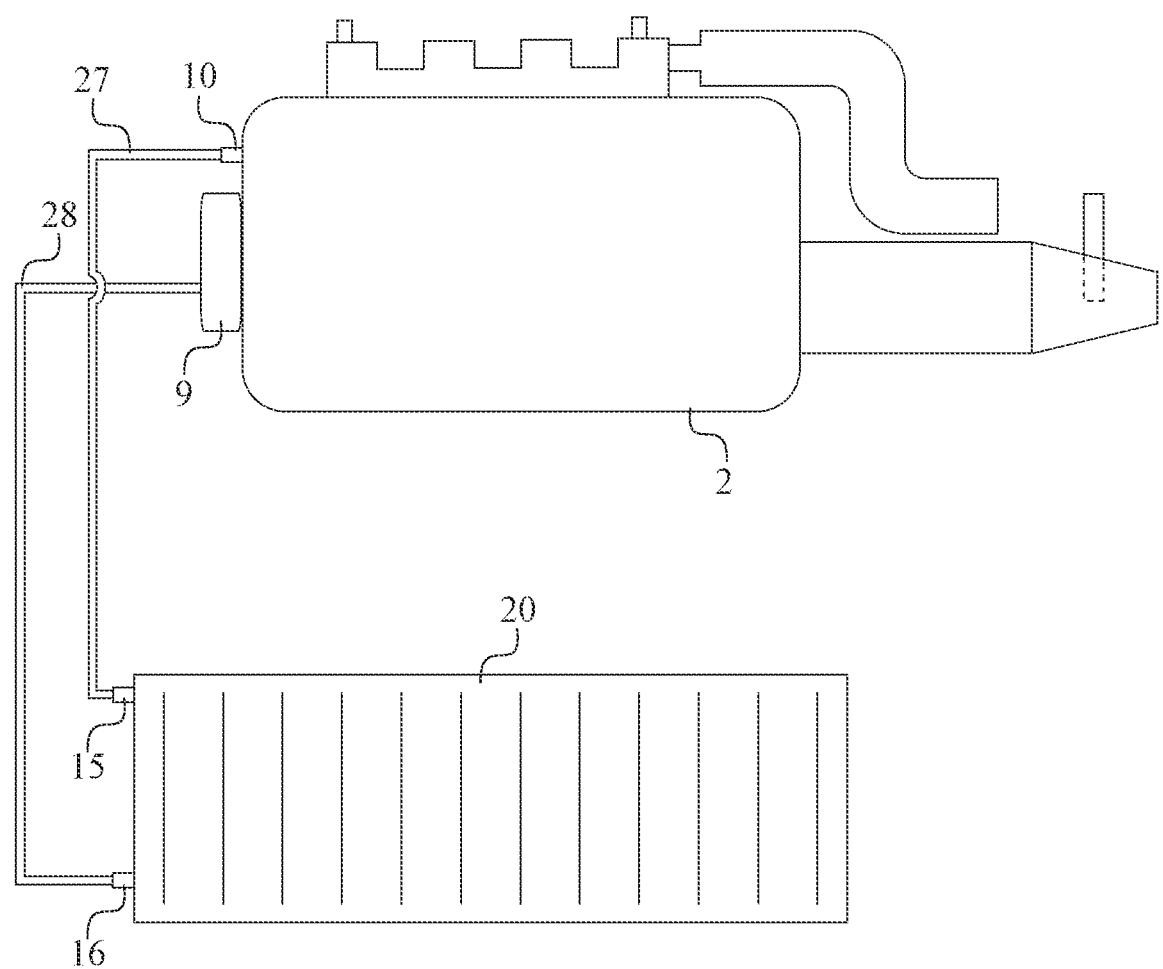
FIG. 4 is an illustration showing the hull-mounted heat exchanger cooling system of the present invention.

As shown in FIG. 4, the present invention further comprises a hot coolant line 27 and a cold coolant line 28 so that the hull-mounted heat exchanger 20 can be in fluid communication with the engine 2. More specifically, the hot coolant line 27 is mounted in between the inlet port 15 of the hull-mounted heat exchanger 20 and the coolant outlet 10 so that the heat energy from the engine 2 can be removed and discharged into the hull-mounted heat exchanger 20. Then the heat energy with the coolant is able to dissipate into the hull of the vessel. The cold coolant line 28 is mounted in between the outlet port 16 of the hull-mounted heat exchanger 20 and the water pump 9 thus completing the closed-loop cooling system for the hull-mounted heat exchanger 20.

The present invention works for both wet and dry exhaust applications. When wet exhaust is used within the vessel, all exhaust 8 components are constructed of metal and high temperature silicon couplers. In reference to experimental testing, exhaust-temperature of the exhaust 8 reaches a maximum of 185 degrees Fahrenheit at idle without raw water flowing through exhaust 8. The present invention provides an efficient cooling system in comparison to the standard raw water systems or closed loop or keel cooled systems, increases productivity by reducing repair time that involve with failed raw water pumps, maximizes engine/vessel performance, and provides a piece of mind knowing that engines is not going to overheat if the raw water-cooling loop is clogged.

Although the invention has been explained in relation to its preferred embodiment, it is to be understood that many other possible modifications and variations can be made without departing from the spirit and scope of the invention as hereinafter claimed.

What is claimed is:

1. A cooling system for marine jet engine comprising:
   a marine jet engine assembly;
   a pressurized raw water intake;
   a centrifugal filter;
   a strainer;
   a hull-mounted heat exchanger;
   the marine jet engine assembly comprising an engine, a drive shaft, a stator, a manifold heat exchanger, an exhaust, a water pump, and a coolant outlet;
   the pressurized raw water intake being in fluid communication with the stator;
   the centrifugal filter being in fluid communication with the pressurized raw water intake;
   the strainer being in fluid communication with the centrifugal filter;
   a water inlet of the manifold heat exchanger being in fluid communication with the strainer;
   a water outlet of the manifold heat exchanger being in fluid communication with the exhaust;
   an inlet port of the hull-mounted heat exchanger being in fluid communication with the coolant outlet; and
   an outlet port of the hull-mounted heat exchanger being in fluid communication with the water pump.

2. The cooling system for marine jet engine as claimed in claim 1 comprising:
   the drive shaft being operatively coupled to the engine, wherein a mechanical energy of the engine is transferred to a kinetic energy of the drive shaft;
   the drive shaft being enclosed by the stator;
   the manifold heat exchanger being operatively coupled to the engine, wherein the manifold heat exchanger dissipates generated heat energy of the engine;
   the exhaust being operatively coupled to the engine, wherein the exhaust removes generated waste gases from the engine;
   the water pump being operatively coupled to the engine, wherein the water pump circulates a flow of cold coolant into the engine; and
   the coolant outlet being operatively coupled to the engine, wherein the coolant outlet discharges a flow of hot coolant from the engine.

3. The cooling system for marine jet engine as claimed in claim 1 comprising:
   a first connector hose;
   the pressurized raw water intake being mounted to the stator;
   the centrifugal filter being mounted offset to the pressurized raw water intake;
   a supply end of the pressurized raw water intake being positioned within the stator;
   a discharge end of the pressurized raw water intake being positioned external to the stator; and
   the first connector hose being mounted in between the discharge end and an inlet port of the centrifugal filter.

4. The cooling system for marine jet engine as claimed in claim 1 comprising:
   a second connector hose;
   the strainer being mounted offset to the centrifugal filter; and
   the second connector hose being mounted in between an outlet port of the centrifugal filter and an inlet port of the strainer.

5. The cooling system for marine jet engine as claimed in claim 1 comprising:
   a third connector hose; and
   the third connector hose being mounted in between an outlet port of the strainer and the water inlet of the manifold heat exchanger.

6. The cooling system for marine jet engine as claimed in claim 1 comprising:
   a fourth connector hose; and
   the fourth connector hose being mounted in between the water outlet of the manifold heat exchanger and the exhaust.

7. The cooling system for marine jet engine as claimed in claim 1 comprising:
   a hot coolant line;
   a cold coolant line;
   the hull-mounted heat exchanger being mounted offset to the engine;
   the hot coolant line being mounted in between the inlet port of the hull-mounted heat exchanger and the coolant outlet; and
   the cold coolant line being mounted in between the outlet port of the hull-mounted heat exchanger and the water pump.

8. A cooling system for marine jet engine comprising:
   a marine jet engine assembly;
   a pressurized raw water intake;
   a centrifugal filter;
   a strainer;
   a hull-mounted heat exchanger;
   a first connector hose;
   the marine jet engine assembly comprising an engine, a drive shaft, a stator, a manifold heat exchanger, an exhaust, a water pump, and a coolant outlet;
   the pressurized raw water intake being mounted to the stator;
   the centrifugal filter being mounted offset to the pressurized raw water intake;
   the pressurized raw water intake being in fluid communication with the stator;
   a supply end of the pressurized raw water intake being positioned within the stator;
   a discharge end of the pressurized raw water intake being positioned external to the stator;
   the centrifugal filter being in fluid communication with the pressurized raw water intake;
   the first connector hose being mounted in between the discharge end and an inlet port of the centrifugal filter;
   the strainer being in fluid communication with the centrifugal filter;
   a water inlet of the manifold heat exchanger being in fluid communication with the strainer;
   a water outlet of the manifold heat exchanger being in fluid communication with the exhaust;
   an inlet port of the hull-mounted heat exchanger being in fluid communication with the coolant outlet; and
   an outlet port of the hull-mounted heat exchanger being in fluid communication with the water pump.

9. The cooling system for marine jet engine as claimed in claim 8 comprising:
   the drive shaft being operatively coupled to the engine, wherein a mechanical energy of the engine is transferred to a kinetic energy of the drive shaft;
   the drive shaft being enclosed by the stator;
   the manifold heat exchanger being operatively coupled to the engine, wherein the manifold heat exchanger dissipates generated heat energy of the engine;

the exhaust being operatively coupled to the engine, wherein the exhaust removes generated waste gases from the engine;

the water pump being operatively coupled to the engine, wherein the water pump circulates a flow of cold coolant into the engine; and the coolant outlet being operatively coupled to the engine, wherein the coolant outlet discharges a flow of hot coolant from the engine.

10. The cooling system for marine jet engine as claimed in claim 8 comprising:
a second connector hose;
the strainer being mounted offset to the centrifugal filter; and
the second connector hose being mounted in between an outlet port of the centrifugal filter and an inlet port of the strainer.

11. The cooling system for marine jet engine as claimed in claim 8 comprising:
a third connector hose; and
the third connector hose being mounted in between an outlet port of the strainer and the water inlet of the manifold heat exchanger.

12. The cooling system for marine jet engine as claimed in claim 8 comprising:
a fourth connector hose; and
the fourth connector hose being mounted in between the water outlet of the manifold heat exchanger and the exhaust.

13. The cooling system for marine jet engine as claimed in claim 8 comprising:
a hot coolant line;
a cold coolant line;
the hull-mounted heat exchanger being mounted offset to the engine;
the hot coolant line being mounted in between the inlet port of the hull-mounted heat exchanger and the coolant outlet; and
the cold coolant line being mounted in between the outlet port of the hull-mounted heat exchanger and the water pump.

14. A cooling system for marine jet engine comprising:
a marine jet engine assembly;
a pressurized raw water intake;
a centrifugal filter;
a strainer;
a hull-mounted heat exchanger;
a first connector hose;
a hot coolant line;
a cold coolant line;
the marine jet engine assembly comprising an engine, a drive shaft, a stator, a manifold heat exchanger, an exhaust, a water pump, and a coolant outlet;
the pressurized raw water intake being mounted to the stator;
the centrifugal filter being mounted offset to the pressurized raw water intake;
the pressurized raw water intake being in fluid communication with the stator;
a supply end of the pressurized raw water intake being positioned within the stator;
a discharge end of the pressurized raw water intake being positioned external to the stator;
the centrifugal filter being in fluid communication with the pressurized raw water intake;
the first connector hose being mounted in between the discharge end and an inlet port of the centrifugal filter;
the strainer being in fluid communication with the centrifugal filter;
a water inlet of the manifold heat exchanger being in fluid communication with the strainer;
a water outlet of the manifold heat exchanger being in fluid communication with the exhaust;
the hull-mounted heat exchanger being mounted offset to the engine;
an inlet port of the hull-mounted heat exchanger being in fluid communication with the coolant outlet;
the hot coolant line being mounted in between the inlet port of the hull-mounted heat exchanger and the coolant outlet;
an outlet port of the hull-mounted heat exchanger being in fluid communication with the water pump; and
the cold coolant line being mounted in between the outlet port of the hull-mounted heat exchanger and the water pump.

15. The cooling system for marine jet engine as claimed in claim 14 comprising:
the drive shaft being operatively coupled to the engine, wherein a mechanical energy of the engine is transferred to a kinetic energy of the drive shaft;
the drive shaft being enclosed by the stator;
the manifold heat exchanger being operatively coupled to the engine, wherein the manifold heat exchanger dissipates generated heat energy of the engine;
the exhaust being operatively coupled to the engine, wherein the exhaust removes generated waste gases from the engine;
the water pump being operatively coupled to the engine, wherein the water pump circulates a flow of cold coolant into the engine; and
the coolant outlet being operatively coupled to the engine, wherein the coolant outlet discharges a flow of hot coolant from the engine.

16. The cooling system for marine jet engine as claimed in claim 14 comprising:
a second connector hose;
the strainer being mounted offset to the centrifugal filter; and
the second connector hose being mounted in between an outlet port of the centrifugal filter and an inlet port of the strainer.

17. The cooling system for marine jet engine as claimed in claim 14 comprising:
a third connector hose; and
the third connector hose being mounted in between an outlet port of the strainer and the water inlet of the manifold heat exchanger.

18. The cooling system for marine jet engine as claimed in claim 14 comprising:
a fourth connector hose; and
the fourth connector hose being mounted in between the water outlet of the manifold heat exchanger and the exhaust.

* * * * *